(12) United States Patent
Negishi et al.

(10) Patent No.: US 6,285,689 B1
(45) Date of Patent: *Sep. 4, 2001

(54) METHOD AND APPARATUS FOR VERIFYING MULTIPLEXING SCHEDULE OF DIGITAL SIGNALS AND APPARATUS FOR MULTIPLEXING DIGITAL SIGNALS

(75) Inventors: Shinji Negishi; Katsumi Tahara, both of Kanagawa; Mikita Yasuda, Tokyo; Noriaki Oishi, Kanagawa, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/859,402

(22) Filed: May 20, 1997

(30) Foreign Application Priority Data

May 24, 1996 (JP) ............................................. P08-130027

(51) Int. Cl.$^7$ ................................. H04J 3/16; H04J 3/22; H04H 1/04; H04N 7/12
(52) U.S. Cl. .......................... 370/537; 370/465; 370/468; 370/487; 348/423; 348/515
(58) Field of Search .................................... 370/465, 468, 370/537, 538, 487, 490, 522; 348/465, 906, 845.3, 7, 10, 423, 515

(56) References Cited

U.S. PATENT DOCUMENTS

| | | | |
|---|---|---|---|
| 5,550,593 | * 8/1996 | Nakabayashi | 348/465 |
| 5,574,505 | * 11/1996 | Lyons et al. | 348/426 |
| 5,671,226 | * 9/1997 | Murakami et al. | 370/474 |
| 5,686,965 | * 11/1997 | Auld | 348/423 |
| 5,838,678 | * 11/1998 | Davis et al. | 370/389 |
| 5,894,328 | * 4/1999 | Tahara et al. | 348/423 |

* cited by examiner

Primary Examiner—Huy D. Vu
Assistant Examiner—M. Phan
(74) Attorney, Agent, or Firm—Frommer Lawrence & Haug LLP; William S. Frommer; Darren M. Simon (57) ABSTRACT

A method and an apparatus for verifying a multiplexing schedule of digital signals and an apparatus for multiplexing the digital signals are provided. The verifying method includes the processes of extracting access unit information about each decoding unit from each elementary stream of the digital signal, determining schedule information about time division of each elementary stream, based on the access unit information, and verifying whether or not the multiplexing schedule for generating the multiplexed stream is valid, based on the access unit information and the schedule information. The verifying apparatus includes an extracting section for extracting access unit information about a decoding unit from each elementary stream of the digital signal, a determining section for determining schedule information about time division of the elementary stream, based on the access unit information, and a verifying section for verifying whether or not the multiplexing schedule for generating the multiplexed stream is valid, based on the access unit information and the schedule information.

4 Claims, 8 Drawing Sheets

METHOD AND APPARATUS FOR VERIFYING MULTIPLEXING SCHEDULE OF DIGITAL SIGNALS AND APPARATUS FOR MULTIPLEXING DIGITAL SIGNALS

BACKGROUND OF THE INVENTION

1. Field of the Invention

The present invention relates to a method and an apparatus for verifying a multiplexing schedule of digital signals which are suitable to scheduling executed when multiplexing the digital signals, and an apparatus for multiplexing digital signals.

2. Description of the Related Art

Today, an image signal and a speech signal are compressed according to the MPEG (Moving Picture Coding Experts Group) standards compressing system. Then, the compressed signals (elementary streams) compose a multiplexed stream. The multiplexed stream is recorded on a recording medium Further, a multiplexed stream recorded on the recording medium is reproduced by a reproducing apparatus so that the multiplexed stream may be separated into the original elementary streams, from each of which the image signal and the speech signal are decoded.

The method for separating the multiplexed stream into elementary streams is regulated according to the ISO (International Organization for Standardization) 13818-1 or 11172-1, for example. This separating method employs an ideal decoder and is termed a STD (System Target Decoder) model.

The time-divisional multiplexed elementary streams are applied to the STD model. The multiplexed stream is applied to the STD model at regular times by decoding a clock reference that is encoded time information (termed SCR: System Clock Reference).

Figure 1:
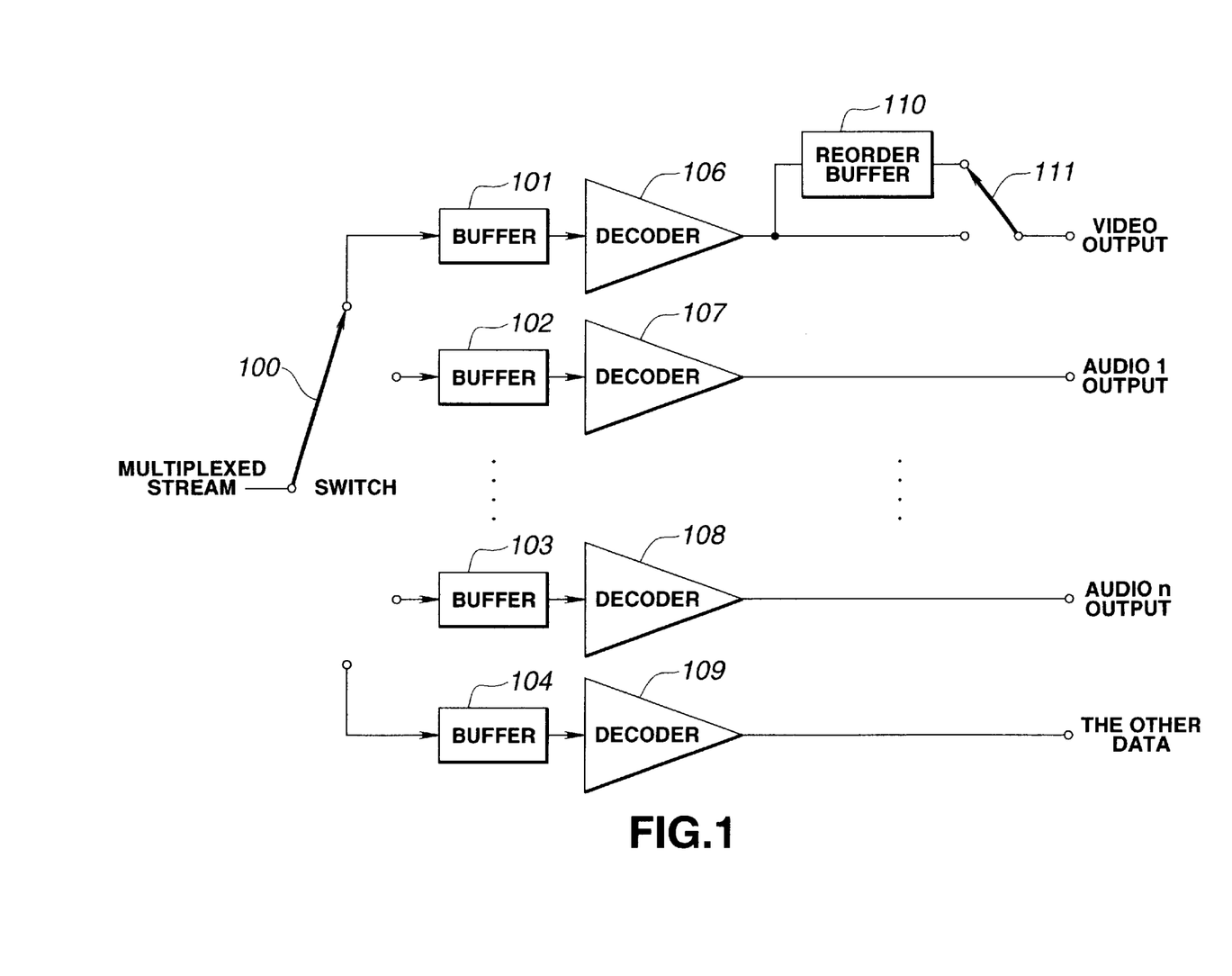
FIG. 1 is a block diagram showing the so-called STD model.

The multiplexed stream applied to the STD model is divided into the elementary streams by a switch 100 as shown in FIG. 1. Those elementary streams are supplied to the corresponding buffers 101 to 104.

The rate information encoded in the multiplexed stream (termed MUX_rate) is supplied to the buffers selected by the switch. The input to the buffer not selected by the switch 100 is 0.

The elementary stream is pulled out of the buffer at each access unit that is a decoding unit defined for each elementary stream. At a decoding time of the access unit that is another piece of time information encoded in the stream, the data of the access unit is instantly pulled out of the buffer and then is supplied to the decoders 106 to 109. This decoding time guarantees the synchronization among the elementary streams.

For example, for the so-called I picture or P picture, the video data decoded by the decoder 106 is output through a reorder buffer 110, a selected terminal, and a switch 111. For the so-called B picture, the video data is output through another selected terminal and the switch 111. The other data such as the audio data and the subtitle data decoded by the decoders 107 to 109 are directly output.

The time-divisional multiplexing scheduling is executed without overflowing or underflowing the buffers 101 to 104. Further, the proper clock reference is required to be encoded in the multiplexed stream.

Figure 2A:
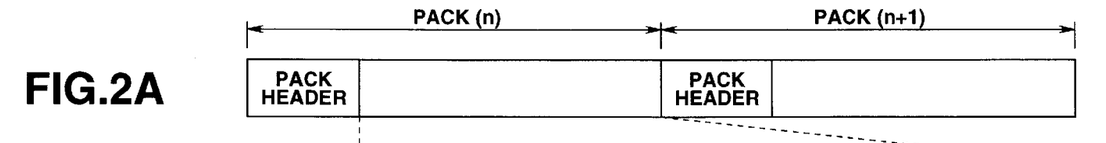
FIGS. 2A to 2E are views showing relation between a multiplexed stream supplied to the STD model and an amount of data occupying a buffer of the STD model.
Figures 2B, 2C:
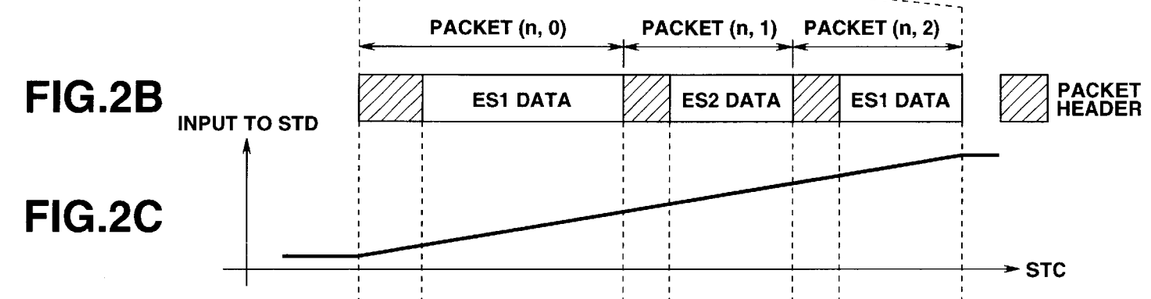

As shown in FIGS. 2A and 2B, the multiplexed stream is composed of packets, each packet containing the data of the single elementary stream. The set of the packets composes a pack. The size of the packet or the pack is optional and is ordinarily determined according to a transmission/storage medium.

The pack header contains the SCR that is the reference time of the STD and the MUX_rate encoded therein as additional information. The input rate to the STD model may be variable for each pack according to the MUX_rate encoded on the pack header. Further, the packet header contains time points when the following access units are decoded (termed a DTS Decoding Time stamp) encoded therein. The STD model is executed to reset an internal clock (termed an STC: System Time Clock) to the SCR when the SCR is input to the model. The SCR is required to be inserted to the STD model at intervals of 0.7 sec or shorter.

Figure 2D:
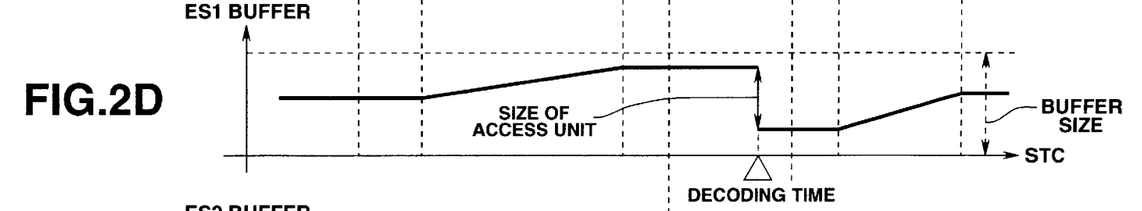

As shown in FIG. 2C, assume that the input of the multiplexed stream to the STD model is executed at the MUX_rate. When the STD model reads the SCR1 as a value of the SCR inside of the pack header, the STD model serves to set the STC to a value of the SCR1. When the STC is counted up to the same value of the SCR1, the STD model starts to read the data ES1 to the buffer 101 and continues to read the data ES1 until all data is read out of the packet. When the STD model reads the DTS1 as a value of the DTS, as shown in FIG. 2D, the data of the access units stored in the buffer 101 is pulled out at a time point indicated by the DTS1.

Figure 2E:
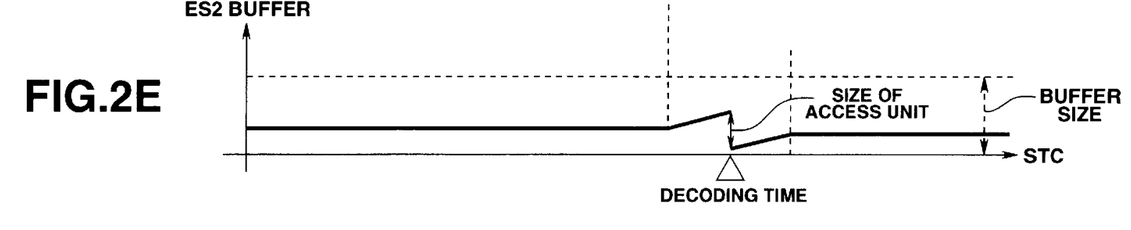

On the other hand, the buffer 102 is served to read the data ES2 when the STC value is counted up to the value of the SCR2, for example. When the STD model reads the DTS2, as shown in FIG. 2E, at the time point indicated by the DTS2, the data of the access units stored in the buffer 102 is pulled out.

At this time, the amount of the data occupying each buffer is equal to or smaller than a buffer size and the data of the access units decoded at the decoding time point have been already applied in the buffer. Hence, the multiplexing schedule is considered proper.

However, if the amount of data occupying the buffer is too larger or too small, the buffer may be broken.

Figure 3A:
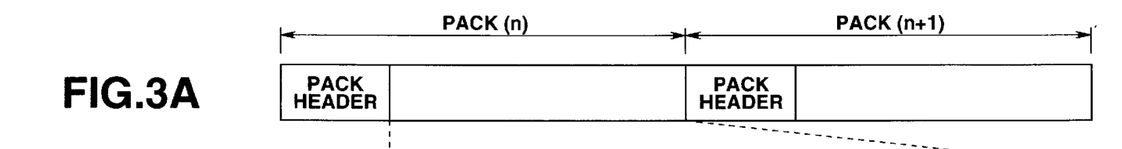
FIGS. 3A to 3E views showing a multiplexed stream supplied to the STD model and a state where a buffer is broken by the data occupying a buffer of the STD model.
Figures 3B, 3C:
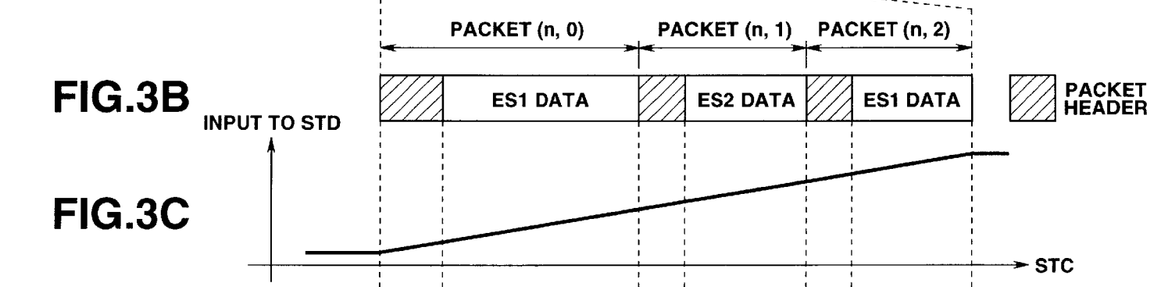
Figure 3D:
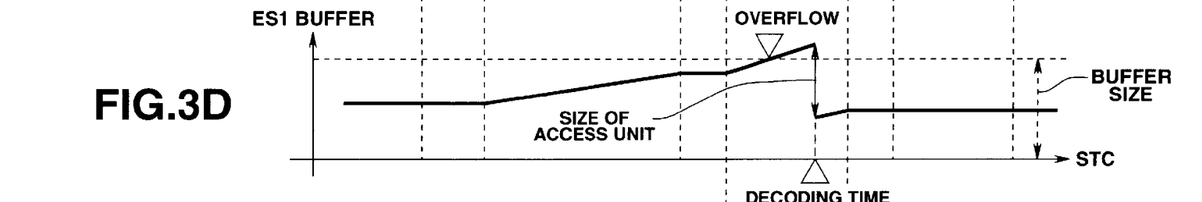

For example, and with reference to FIGS. 3A–3E (wherein FIGS. 3A–3C are substantially identical to FIGS. 2A–2C and, in the interest of brevity, are not described again), if the amount of data occupying the buffer exceeds a given buffer size, the overflow takes place in the buffer. As shown in FIG. 3D, the buffer 101 is overflown while the packet (n, 1) is being input. The schedule in which the packet (n, 1) multiplexes the data ES1 does not satisfy the STD model.

Figure 3E:
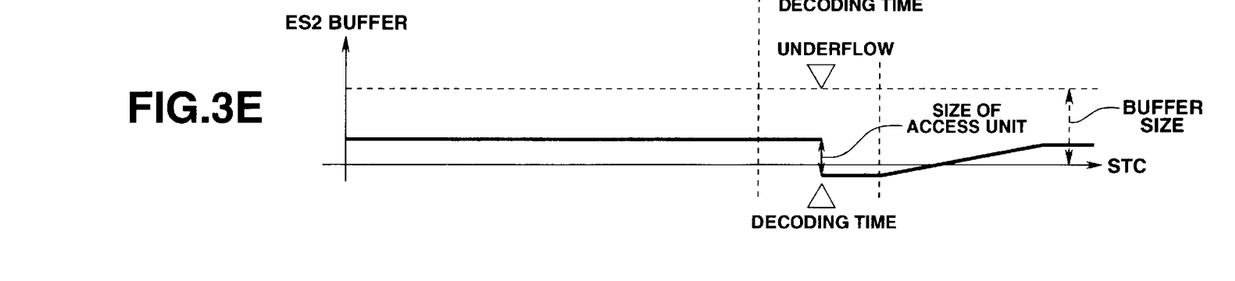

On the other hand, as shown in FIG. 3E, for the data ES2, the data of the access units decoded at the decoding time points are not still completely applied to the buffer. This is an underflow of the buffer 102. The schedule in which the packet (n, 2) multiplexes the data ES2 is considered erroneous.

As mentioned above, in a case of executing the multiplexing schedule, it is essential to verify whether or not the multiplexed stream generated as a result of the schedule meets the STD model.

In order to verify whether or not the multiplexed stream meets the STD model, it is necessary to grasp the size and the decoding time point of the access unit and simulate the I/O operation of the buffer.

For the ISOs 13818-1 and 11172-1, the conditions the multiplexed stream meets are as follows.

The data does not stay within the buffer for one second or longer (one-second rule).

Less than 31 access units are allowed to be put in the buffer.

The verification is executed at each slit and the DTS (decoding time point).

The slit between the access units is identified by the start code for indicating the start of the start unit. For example, the access unit of the image signal encoded by the ISOs 13818-2 and 11172-2 is started at a four-byte start code.

For the method for detecting a slit between the access units from the data input to the buffer, there has been proposed a method for decoding the compressed data and detecting an end of the access unit and a method for detecting a start code of the access unit in the input data.

By the way, both of these methods are required to check for all data to be input to the buffer and consume long time. Further, the method for actually decoding all data needs an additional processing cost because the decoding is required.

Figure 4A:
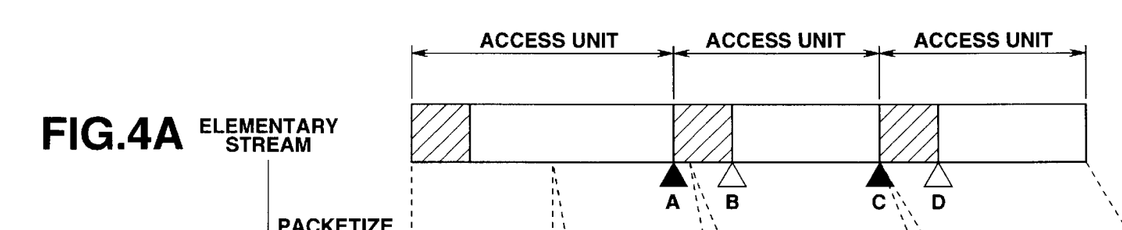
FIGS. 4A to 4C are views showing splits appearing when the multiplexed stream is generated by dividing the elementary stream into access units.
Figure 4B:
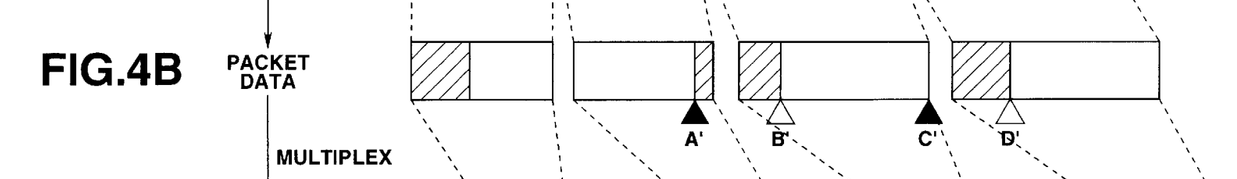

On the other hand, in the method for detecting the start code, as shown in FIG. 4A, at the outset, the start codes are located serially on the elementary stream. As to the data divided into packets according to the multiplexing schedule, as shown in FIG. 4B, the access unit may be divided into one or more packets. Then, the stream time-divisionally multiplexed with the data of another elementary stream based on the multiplexing schedule is arranged so that the divided access units are multiplexed at remote locations as shown in FIG. 4C.

Figure 4C:
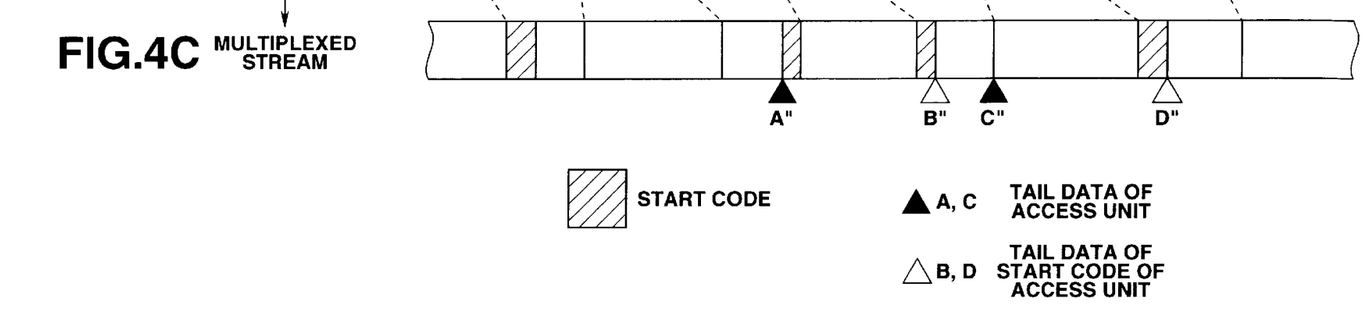

Concretely, as shown in FIG. 4C, it is impossible to know an end All of the previous access unit until a All time point when the start code is detected. Hence, it is necessary to verify the schedule after the verifying process is returned from the time point when All is detected to the time point when All is input.

Further, in a case that on the C11, the end of the access unit coincides with the end of the packet, until the start code is detected on the D11, it is impossible to determine that C11 is the end of the access unit.

In a case that a decode of the access unit takes place between the C11 and the D11, since the size of the access unit is unknown, it is impossible to verify the pull of the data from the buffer. For verifying it, therefore, the verifying process is required from when the D11 is detected back to when the C11 is input. In other words, it is necessary to pre-read the data until the next access unit start is detected.

That is, for verifying whether or not the multiplexed stream meets the STD model, it is necessary to actually decode the data and pre-read the data until the start of the next access unit is detected.

For the ISOs 13818-1 and 11172-1, the maximum value of the interval between the timestamps of the SCR is determined as the conditions the multiplexed stream should meet. Taking an example of the SCR, for verifying the interval between the serial SCRs with the multiplexed stream as an input, the start code of the pack header is detected in the data input to the STD model, and it is necessary to actually pull out of the field of the SCR encoded in the pack header. These operations are quite inconvenient.

The present invention is considered in the foregoing conditions, and it is an object of the present invention to provide a method and an apparatus for verifying a multiplexing schedule of digital signals and an apparatus for multiplexing the digital signals which are arranged to verify the multiplexing schedule without having to actually decode the data and pre-read the data until the start of the next access unit is detected.

SUMMARY OF THE INVENTION

According to a first aspect of the invention, a method for verifying a multiplexing schedule for generating a time-divisional multiplexed stream from elementary streams of plural digital signals, includes the steps of: extracting access unit information about a decoding unit from each elementary stream; determining schedule information about time division of each elementary stream, based on the access unit information; and verifying whether or not the multiplexing schedule for generating the multiplexed stream is valid, based on the access unit information and the schedule information.

According to a second aspect of the invention, a method for verifying a multiplexing schedule for generating a time-divisional multiplexed stream from elementary streams of plural digital signals, includes the steps of: extracting access unit information about a decoding unit from each elementary stream; extracting schedule information from the multiplexed stream generated by time-divisionally multiplexing the elementary stream; and, verifying whether or not the multiplexing schedule for generating the multiplexed stream is valid, based on the access unit information and the schedule information.

According to a third aspect of the invention, an apparatus for verifying a multiplexing schedule for generating time-divisional multiplexed stream from elementary streams of plural digital signals, includes: an extracting section for extracting access unit information about a decoding unit from each elementary unit; a determining section for determining schedule information about time division of the elementary stream, based on the access unit information; and a verifying section for verifying whether or not the multiplexing schedule for generating the multiplexed stream is valid based on the access unit information and the schedule information.

According to a fourth aspect of the invention, an apparatus for multiplexing digital signals, for generating a time-divisional multiplexed stream from elementary streams of plural digital signals, includes: an extracting section for extracting access unit information about a decoding unit from each elementary stream; a determining section for determining schedule information about time division of the elementary stream, based on the access unit information; a generating section for generating the multiplexed stream, based on each elementary stream, the access unit information, and the schedule information; and a verifying section for verifying whether or not the multiplexing schedule for generating the multiplexed stream is valid, based on the access unit information and the schedule information.

According to a fifth aspect of the invention, an apparatus for multiplexing digital signals, for generating a time-divisional multiplexed stream from elementary streams of plural digital signals, includes: an extracting section for extracting access unit information about a decoding unit from each elementary stream; a generating section for determining schedule information about time division of each elementary stream based on the access unit information and generating time-divisional multiplexed stream based on each elementary stream, the access unit information, and the schedule information; an extracting section for extracting the schedule information from the time-divisional multiplexed stream; and a verifying section for verifying whether or not the multiplexing schedule for generating the multiplexed stream is valid, based on the access unit information and the schedule information.

Further objects and advantages of the present invention will be apparent from the following description of the preferred embodiments of the invention as illustrated in the accompanying drawings.

BRIEF DESCRIPTION OF THE DRAWINGS

Further features, advantages and characteristics of the invention are explained in the following with reference to the drawings, in which.

DESCRIPTION OF THE PREFERRED EMBODIMENTS

Hereafter, the description will be oriented to verification for multiplexing schedule of digital signals according to the present invention along the appended drawings. The present invention may be suitably applied to verifying the validity about a multiplexing schedule such as an occupying amount of a decoder buffer and a time management of a decoder for synchronously reproducing elementary streams of the time-divisionally multiplexed digital signals.

Figure 5:
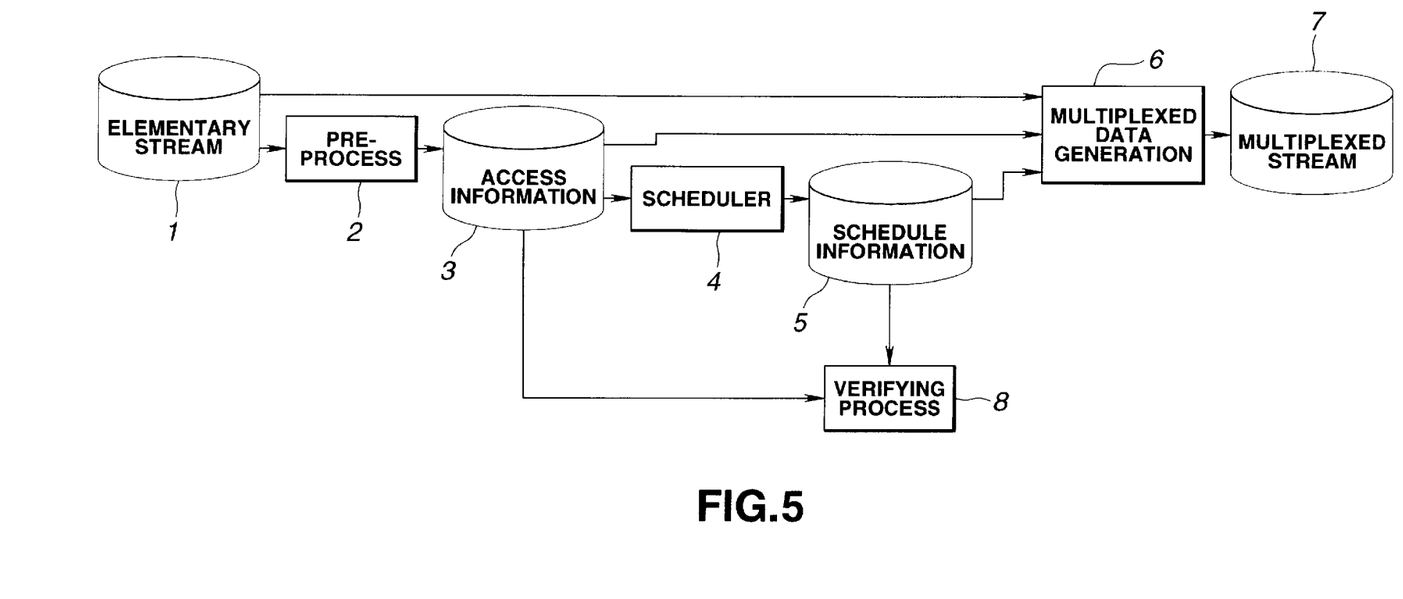
FIG. 5 is a block diagram showing an arrangement of an apparatus for multiplexing digital signals to which a method for verifying a multiplexing schedule of digital signals according to the present invention is applied.

The apparatus for multiplexing the digital signals to which the present invention applies includes a pre-processing section 2 for pre-processing elementary streams stored in a storage medium 1, a storage medium 3 for storing access unit information supplied from the pre-processing section 2, a scheduler 4 for determining a time-divisionally multiplexing schedule on the basis of the access unit information from the storage medium 3, a storage medium 5 for storing schedule information from the scheduler 4, and a multiplexed data processing section 6 for generating multiplexed streams on the basis of the elementary streams from the storage mediums 1, 3 and 5.

The storage medium 1 stores the elementary streams to be multiplexed and then supplies these elementary streams to the pre-processing section 2 as well as the multiplexed data generating section 6.

The pre-processing section 2 receives the supply of the elementary streams from the storage medium 1 and extracts the access unit information from those elementary streams. This access unit information is composed of a access unit size and a decoding time point. The information about the decoding time point is a decoding time point itself or the data required for calculating the decoding time point. For example, the decoding time point may be derived from the image data encoded according to the ISO 13818-2 if the frame rate of the elementary stream and the repeat_first_field/picture_coding_type of the access unit are known. The repeat_first_field is a flag indicating a repetitively displayed redundant field. The picture_coding_type is a flag indicating an encoding type of the picture.

The storage medium 3 stores the access unit information from the pre-processing section 2 and then supplies the information to the scheduler 4 as well as the verifying section 8.

The scheduler 4 determines the time-divisionally multiplexing schedule on the information of the access unit. This schedule is determined so that the overflow of the data is inhibited as a result of monitoring the data occupying amount of the buffer provided in the decoder. Concretely, the schedule information determined herein contains a size of a pack header about a pack, a SCR (System Clock Reference) which is a reference value of a reference clock owned by the STD model, and rate information (termed MUX_rate). The schedule information about a packet contains a packet type, a time point when the following access unit is decoded (termed DTS: Decoding Time Stamp), a size of a header, and a data size of a packet.

The storage medium 5 stores the schedule information from the scheduler 4 and supplies the schedule information to the multiplexed data generating section 6 as well as the verifying section 8.

The multiplexed data generating section 6 operates to divide the plural elementary streams and supply one multiplexed stream 7 that is the multiplexed data.

Figure 6:
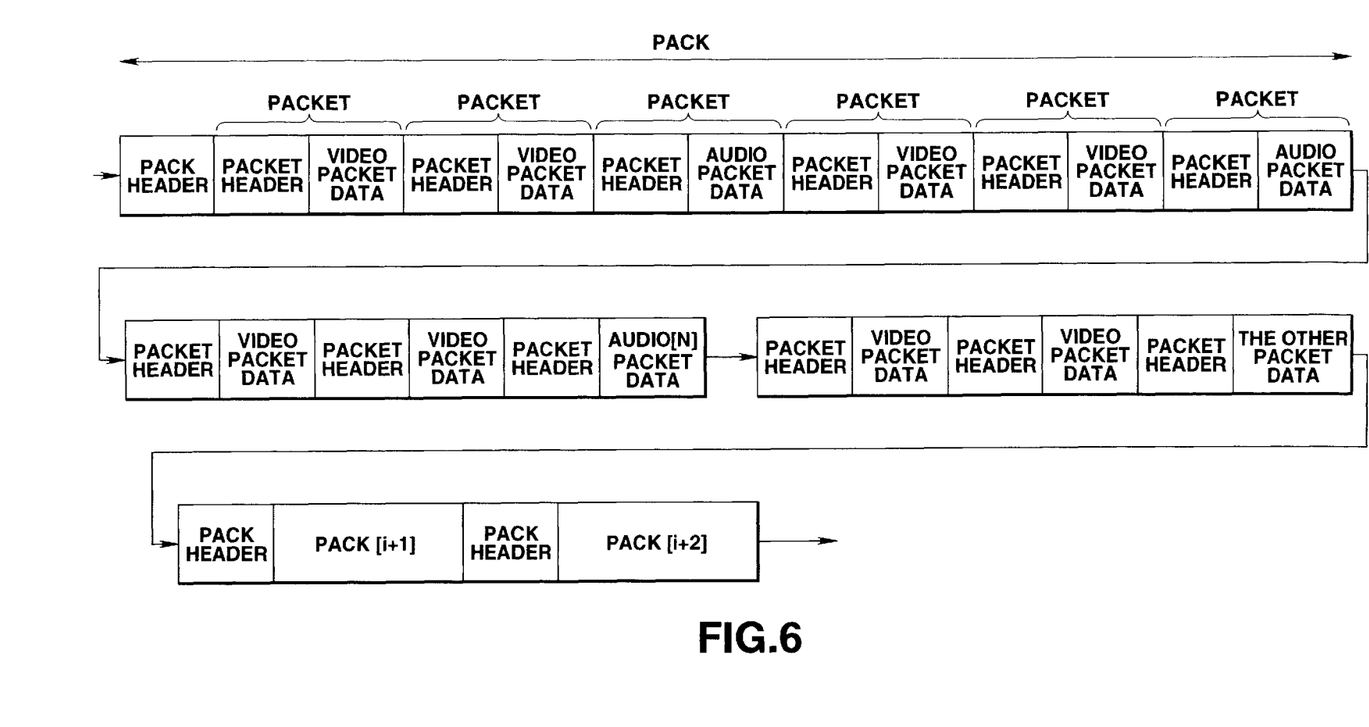
FIG. 6 is a view showing a composition of a multiplexed stream generated by the apparatus for multiplexing the digital signals.

The multiplexed stream generated as described above, as shown in FIG. 6, is formed by time-divisionally multiplexing the elementary streams and is composed of packets. Each packet is consistently composed of a single elementary stream, which never contains the data of another elementary stream. Each packet is accompanied with the packet head. The packet header contains the information indicating the content of the packet, the DTS, and the PTS (Presentation Time stamp). The DTS and the PTS may be described at an access unit. The DTS indicates the time point when the corresponding access unit is pulled out of each buffer in the STD model. The PTS indicates a decoding time point and a display time point when the corresponding access unit is pulled out of each buffer in the STD model. The international Standards ISO 11172-3 for compressing a speech signal keeps the time points of the DTS and the PTS identical with each other. Hence, on the multiplexed stream, only the PTS value is described. Further, the SCR is a reference value for a reference clock owned by the STD model and is described in the pack header. When the SCR is handled, it is possible to read the multiplexed stream on the decoding side and control the input of the data through each buffer. The size of the packet is in general variable. The information about the size is contained in the packet header.

On the other hand, the verifying section 8 is able to simulate the transition of an occupation amount of the buffer on the basis of the access unit information from the storage medium and the schedule information from the storage medium 5 obtained in the multiplexing process, without having to actually process the multiplexed stream.

That is, the determination of the time-divisional multiplexing schedule leads to the determination of the aforementioned schedule information. Only if the information corresponding to the multiplexing history is kept output, the verifying process does not need the actual multiplexed data. Further, only based on the schedule information, it is possible to easily verify wether or not the limitation of the interval between the adjacent timestamps is observed.

The multiplexing schedule of the multiplexed stream generated as above is verified by the apparatus for verifying the multiplexing schedule of the digital signals including the pre-processing section 2, the scheduler 4) and the verifying section 8.

Figure 7:
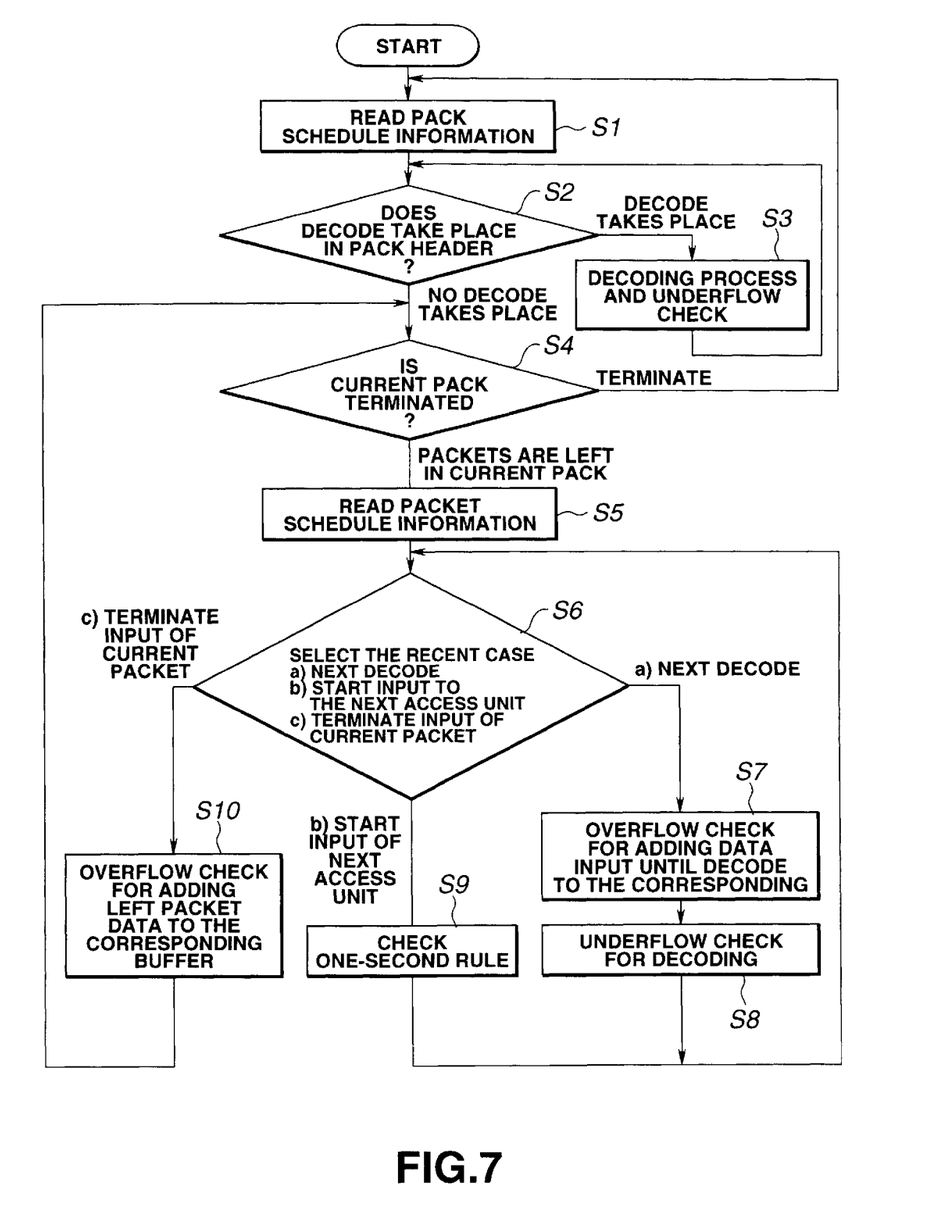
FIG. 7 is a flowchart showing a concrete process for verifying the multiplexing schedule of the digital signals.

That is, if the access unit information and the schedule information are prepared by the pre-processing section 2 and the scheduler 4, the verifying section 8 executes the operation of the flowchart shown in FIG. 7. In the flowchart, proceeding to a step S1, the schedule information of the pack is read. Then, the verifying section 8 checks if the interval of the SCR is 0.7 second or lower. Then, the operation goes to a step S2.

At the step S2, the verifying section 8 compares the recent decoding time point with the input end time point of the packet header. When the pack header is input, the start of the decoding is determined. Then, the operation goes to a step S3.

At the step S3, the verifying section 8 operates to reduce the size of the access unit to be decoded from the occupation amount of the corresponding buffer. The verifying section 8 operates to check the size of the access unit not to cause the underflow of the access unit. The verifying section 8 selects the next decoding time point and then returns to the step S2.

On the other hand, if, at the step S3, it is determined that no decoding is brought about when the pack header is input, the operation goes to a step S4. At this step, the verifying section 8 determines whether or not the current pack is terminated. On the termination, the operation goes to a step S1. If the next access unit information and schedule information are prepared, the operation after the step S1 is executed. On the other hand, unless the next access unit information and schedule information are prepared, no operation after the step S1 is executed. Without terminating the current pack, when the packet is left in the current pack, the operation goes to a step S5. At the step S5, the verifying section 8 reads the pack schedule information, and then the operation goes to a step S6.

At the step S8, the verifying section 8 processes the recent one to the current time point. That is, when the verifying section 8 determines that the next decoding is close to the current time point, that is, the possibility of causing underflow is high, the operation goes to a step S7.

At the step S7, the verifying section 8 operates to add the packet data amount input until the decoding time point to the occupation amount of the corresponding buffer. At this time, the verifying section 8 operates to check the packet data amount not to cause the overflow of the packet data. Then, the operation goes to a step S8.

At the step S8, the verifying section 8 operates to reduce the size of the access unit to be decoded from the occupation amount of the corresponding buffer. At this time, the verifying section 8 checks the size of the access unit not to cause the underflow of the packet data. Then, the operation goes to a step S6.

On the other hand, at the step S6, when the verifying section 8 determines that the start of inputting the next access unit is close to the current time point, the operation goes to a step S9. At this step, the verifying section 8 checks whether or not the time between the time point when the input of the access unit is started and the time point when the access unit is decoded is within one second (one-second rule). Then, the verifying section 8 checks whether or not the number of access units in the buffer is equal to or lower than the limited value. The operation goes to a step S6.

When, at the step S6, the verifying section 8 determines the input of the current packet is close to the current time point, that is, the data is further supplied to the buffer, the operation goes to a step S10. At this step, the verifying section 8 operates to add the remaining packet data to the occupation amount of the corresponding buffer. At this time, the verifying section 8 checks the packet data not to cause the overflow of the packet data. Then, the operations returns to the step S4.

As set forth above, in the verification for the multiplexing schedule of the digital signals, the schedule for the multiplexed stream is easily executed by using the access unit information and the schedule information without actually encoding the data.

Next, the description will be oriented to the second embodiment of the present invention. The same components of the second embodiment as those of the first embodiment have the same reference numbers. The description about the same components is left out.

Figure 8:
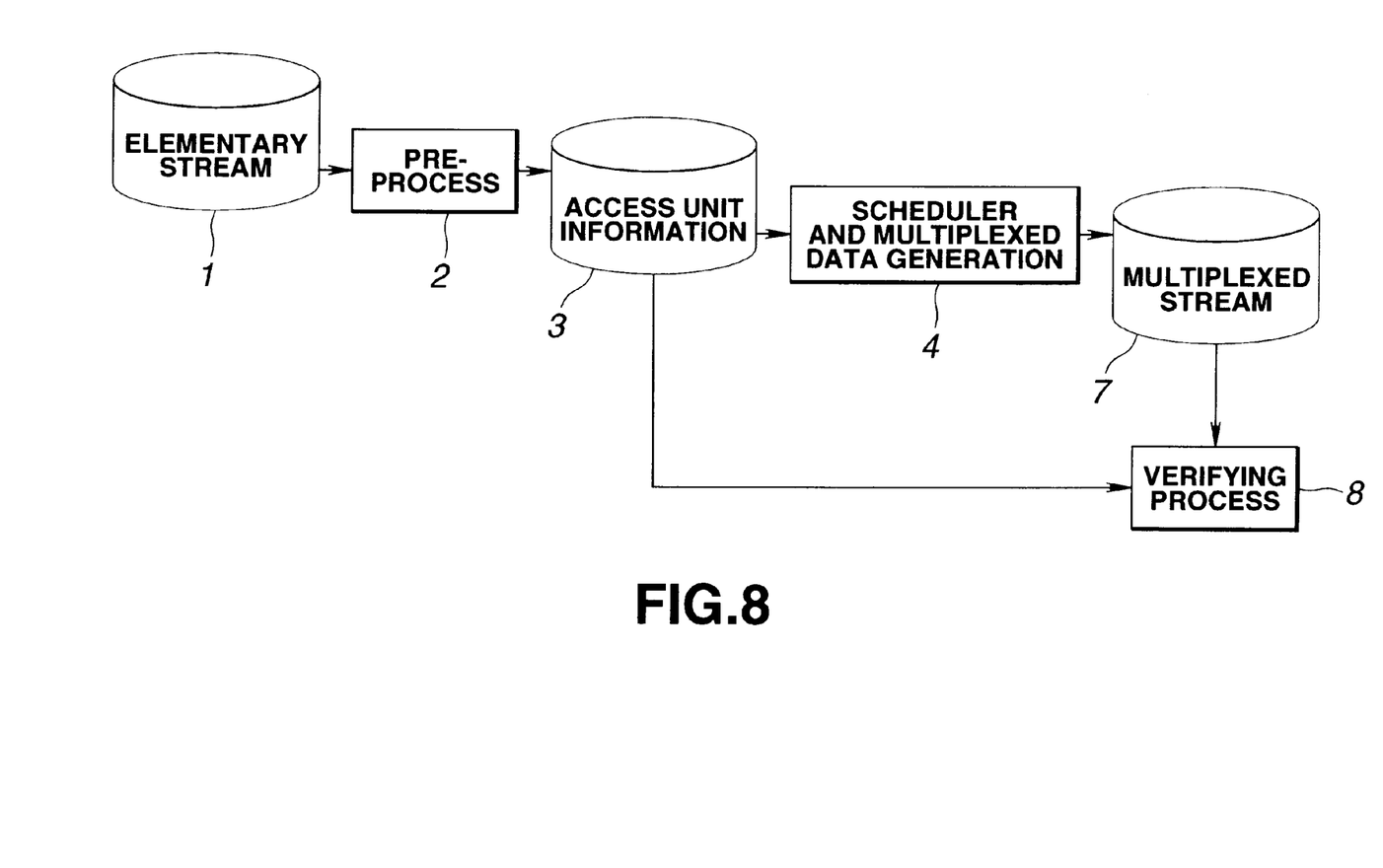
FIG. 8 is a block diagram showing an apparatus for multiplexing the digital signals according to another embodiment of the present invention.

The apparatus for multiplexing the digital signals according to the second embodiment of the present invention, as shown in FIG. 8, includes a pre-processing section 2 for pre-processing the elementary stream stored in the storage medium 3 1, a storage medium for storing the access unit information supplied from the pre-processing section 2, a scheduler and multiplexed data generating section 4 for determining the schedule for time-divisional multiplexing on the basis of the access unit information supplied from the storage medium 3 and generating the multiplexed stream, a storage medium 7 for storing the multiplexed stream from the scheduler and multiplexed data generating section 4, and a verifying section 8 for verifying the multiplexing schedule on the basis of the data from the storage mediums 3 and 7.

According to this embodiment of the invention, the verifying section 8 receives the actual multiplexed stream and the access unit information and verifies the multiplexing schedule indicated at the steps S1 to S10 of the flowchart shown in FIG. 7 on the basis of the information. The schedule information is extracted from the pack header and the packet header of the multiplexed stream.

That is, the verifying method is arranged to skip the data portion of the packet input to the buffer of the STD model by using the access unit information without having to actually process the multiplexed data. Hence, the verifying method with the access unit information greatly reduces its processing time and facility cost as compared with the method with no access unit information.

As set forth above, the method for verifying the multiplexing schedule of the digital signals according to the present invention is arranged to extract each piece of access unit information from each elementary stream, determine the schedule information of the multiplexed stream formed by time-divisionally multiplexing each elementary stream on each piece of access unit information, and verify the validity of the multiplexing schedule of the multiplexed stream on the basis of these access unit information and schedule information. That is, if no multiplexed stream to be verified is left, the verifying method does not need to decode the packet data of the multiplexed stream for checking it, resulting in greatly reducing the verifying time and the facility cost.

Further, the apparatus for verifying the multiplexing schedule of the digital signals according to the present invention is arranged to extract the access unit information and the schedule information about the decoding unit information obtained from the elementary stream when generating the multiplexed stream. The apparatus enables to verify whether or not the multiplexing schedule of the multiplexed stream is valid without actually decoding the generated multiplexed stream and thereby reduce the verifying time and the facility cost for the verification.

The apparatus for verifying the multiplexing schedule of the digital signals according to the present invention is arranged to extract the access unit information about each decoding unit obtained in generating the multiplexed stream and extract the schedule information from the generated multiplexed stream for verifying whether or not the multiplexing schedule of the multiplexed stream is valid. That is, the verifying apparatus enables to reduce the verifying time and the facility cost for the verification without having to actually decode the generated multiplexed stream.

The apparatus for multiplexing the digital signals according to the present invention provides a capability of generating the multiplexed stream from each elementary stream and verifying whether or not the multiplexing schedule of the multiplexed stream is valid on the basis of the access unit information and the schedule information obtained in generating the multiplexed stream. That is, the apparatus for multiplexing the digital signals enables to make sure that the multiplexing schedule is valid without having to actually decode the generated multiplexed stream and contribute to reducing the verifying time and the facility cost for the verification.

The apparatus for multiplexing the digital signals according to the present invention provides a capability of generating the multiplexed stream from each elementary stream and verify whether or not the multiplexing schedule of the multiplexing stream is valid on the basis of the access unit information obtained in generating the multiplexed stream and the schedule information extracted from the generated multiplexed stream. That is, the apparatus for multiplexing the digital signals enables to verify whether or not the schedule is valid without having to actually decode the generated multiplexed stream by extracting only the schedule information of the generated multiplexed stream and thereby contribute to reducing the verifying time and the facility cost for the verification.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for verifying the validity of a multiplexing schedule for generating a time-divisional multiplexed stream comprised of a sequence of access units each being assigned a plurality of data packets multiplexed from a plurality of elementary streams of compressed digital signals, comprising the steps of:

determining access unit information about the assignment of said plurality of data packets to respective access units;

determining schedule information about the multiplexing of said elementary streams, based on said access unit information; and verifying the validity of the multiplexing schedule based on the access unit information and the schedule information to determine whether, upon demultiplexing and decoding, it is possible for the elementary streams to be synchronously reproduced by a decoder on the basis of whether a decoder buffer will overflow or underflow.

2. A method for verifying the validity of a multiplexing schedule for generating a time-divisional multiplexed stream comprised of a sequence of access units each being assigned a plurality of data packets multiplexed from a plurality of elementary streams of compressed digital signals, comprising the steps of:

determining access unit information about the assignment of said plurality of data packets to respective access units;

determining a schedule information for time-divisionally multiplexing said plurality of elementary streams and generating said multiplexed stream according to said access unit information and said schedule information;

extracting said schedule information from said multiplexed stream; and verifying the validity of the multiplexing based on the access unit information and the schedule information to determine whether, upon demultiplexing and decoding, it is possible for the elementary streams to be synchronously reproduced by a decoder on the basis of whether a decoder buffer will overflow or underflow.

3. An apparatus for verifying the validity of a multiplexing schedule for generating a time-divisional multiplexed stream comprised of a sequence of access units each being assigned a plurality of data packets multiplexed from a plurality of elementary streams of compressed digital signals, comprising:

a preprocessor for determining access unit information about the assignment of said plurality of data packets to respective access units;

a determining section for determining schedule information about the multiplexing of said elementary streams, based on said access unit information; and a verifying section for verifying the validity of the multiplexing schedule based on said access unit information and said schedule information to determine whether, upon demultiplexing and decoding, it is possible for the elementary streams to be synchronously reproduced by a decoder on the basis of whether a decoder buffer will overflow or underflow.

4. An apparatus for verifying the validity of a multiplexing schedule for generating a time-divisional multiplexed stream comprised of a sequence of access units each being assigned a plurality of data packets multiplexed from a plurality of elementary streams of compressed digital signals, comprising the steps of:

a preprocessor for determining access unit information about the assignment of said plurality of data packets to respective access units;

a generating section for determining a schedule information for time-divisionally multiplexing said plurality of elementary streams and for generating said multiplexed stream according to said access unit information and said schedule information;

an extracting section for extracting said schedule information from said multiplexed stream; and a verifying section for verifying the validity of the multiplexing schedule based on said access unit information and said schedule information to determine whether, upon demultiplexing and decoding, it is possible for the elementary streams to be synchronously reproduced by a decoder on the basis of whether a decoder buffer will overflow or underflow.

* * * * *